(No Model.)
A. J. HIGGINS.
OIL CAN HOLDER.
No. 282,986. Patented Aug. 14, 1883.
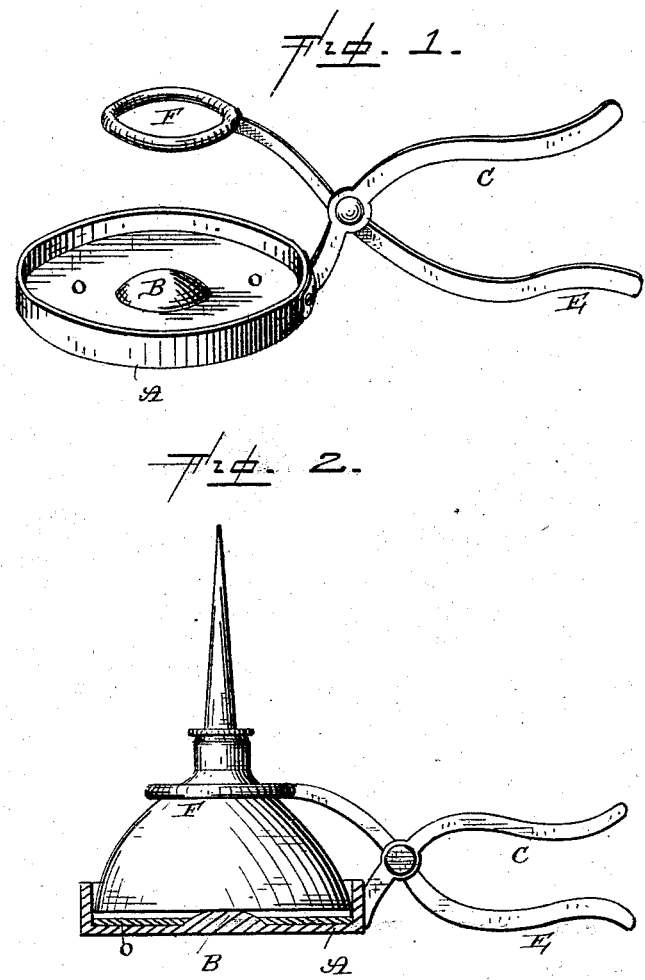

UNITED STATES PATENT OFFICE.

ALBERT J. HIGGINS, OF ALFRED, MAINE.

OIL-CAN HOLDER.

SPECIFICATION forming part of Letters Patent No. 282,986, dated August 14, 1883.

Application filed July 2, 1883. (No model.)

*To all whom it may concern:*

Be it known that I, ALBERT J. HIGGINS, of Alfred, in the county of York and State of Maine, have invented certain new and useful Improvements in Oil-Can Holders; and I do hereby declare the following to be a full, clear, and exact description of the invention, such as will enable others skilled in the art to which it pertains to make and use it, reference being had to the accompanying drawings, which form part of this specification.

My invention relates to an improvement in oil-can holders; and it consists in the combination of a cup in which the oil-can is to be placed, and which cup is provided with a projection for bearing against the center of the under side of the oil-can, and with a handle, with a second pivoted handle or lever, which is provided with a ring at its inner end for catching over the top of the can, as will be more fully described hereinafter.

The object of my invention is to provide a holder for oil cans or cups which will enable the oil to be applied to any part of the machine without having to take the cup or can into the hands.

Figure 1 is a perspective of a holder embodying my invention. Fig. 2 is a side elevation of the same, partly in section.

A represents a cup or holder in which the lower portion of the oil-can is to be placed, and which cup is provided with a suitably-shaped projection, B, at its center, for the purpose of bearing against the center of the bottom of the oil-can. Secured to one side of this holder is the handle C, to which the second handle, E, is pivoted at any desired point. The handle E has formed upon its inner end a ring, F, which catches down over the top of the oil-can, and serves not only to hold it in place, but to force the can down upon the projection B when it is desired to force the oil out for the purpose of lubrication. These two handles have their outer ends project outward in such a manner as to adapt them to be readily taken hold of by the hand, not only for the purpose of holding the can, but of forcing the oil out whenever the movable handle E is suddenly moved toward the stationary handle, C. The ring F is made sufficiently large for it to catch over the tops of oil-cans of different sizes, so that cans of different sizes can be used in connection with the same holder. The oil-cup, having an elastic bottom, is placed in the holder, when the projection B will bear against the center of its bottom. When the handle E is suddenly moved, the bottom is forced upward into the cup, and the oil is forced out in the usual manner. Were it not for this projection B, the holder could not be used with the ordinary spring-bottom oil-cans.

In order to absorb the oil which will always run down over the outside of the cup, there will be placed in the holder any suitable absorbent material, O, to catch this oil and prevent it from coming in contact with and daubing articles around the machine.

Having thus described my invention, I claim—

1. In an oil-can holder, the combination of the cup having a handle secured to it at one side, and provided with a projection upon its bottom to bear against the under side of the oil-can, with a pivoted handle or lever shaped at its inner end so as to catch over the top of the can, substantially as shown and described.

2. The combination of the cup or holder A, having the handle C secured to one side, and having the projection B, for bearing against the bottom of the oil-can, the pivoted lever E, and the absorbent material O, which is placed in the bottom of the cup or holder, substantially as set forth.

In testimony whereof I affix my signature in presence of two witnesses.

ALBERT J. HIGGINS.

Witnesses:
 WILLIE F. FERGUSON,
 GEO. L. HODGSON.